US012689581B1

(12) United States Patent
R et al.

(10) Patent No.: US 12,689,581 B1
(45) Date of Patent: Jul. 21, 2026

(54) SYSTEMS AND METHODS FOR ENSURING REDUNDANCY BETWEEN RELAY AGENTS

(71) Applicant: Juniper Networks, Inc., Sunnyvale, CA (US)

(72) Inventors: Jayadev H R, Bangalore (IN); Kiran Kumar K, Bangalore (IN); Subramanya Sharma P K, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 387 days.

(21) Appl. No.: 18/362,895

(22) Filed: Jul. 31, 2023

(51) Int. Cl.
| | |
|---|---|
| *H04L 45/28* | (2022.01) |
| *H04L 61/5014* | (2022.01) |
| *H04L 61/5076* | (2022.01) |
| *H04L 67/145* | (2022.01) |

(52) U.S. Cl.
CPC .......... *H04L 45/28* (2013.01); *H04L 61/5014* (2022.05); *H04L 61/5076* (2022.05); *H04L 67/145* (2013.01)

(58) Field of Classification Search
CPC . H04L 61/5014; H04L 45/28; H04L 61/5076; H04L 67/145
See application file for complete search history.

(56) References Cited

U.S. PATENT DOCUMENTS

| | | | | | |
|---|---|---|---|---|---|
| 10,091,249 | B2 * | 10/2018 | Imbimbo | ................ | G06F 21/64 |
| 10,999,402 | B2 * | 5/2021 | Shribman | ........... | H04L 63/0407 |
| 2014/0146821 | A1 * | 5/2014 | Lu | ........................... | H04L 45/14 |
| | | | | | 370/395.31 |
| 2018/0019969 | A1 * | 1/2018 | Murthy | ............... | H04L 61/5084 |
| 2018/0302279 | A1 * | 10/2018 | Saltsidis | ............... | H04L 65/102 |
| 2021/0083944 | A1 * | 3/2021 | T | ........................ | H04L 41/0668 |

OTHER PUBLICATIONS

Juniper Networks, Inc., M:N Subscriber Redundancy, Junos OS: Broadband Subscriber Sessions User Guide, Jun. 14, 2023, https://www.juniper.net/documentation/us/en/software/junos/subscriber-mgmt-sessions/index.html.

* cited by examiner

*Primary Examiner* — Angela Widhalm De Rodriguez
(74) *Attorney, Agent, or Firm* — Greenberg Traurig, LLP

(57) ABSTRACT

A computer-implemented method for ensuring consistency between redundant DHCP peers may include establishing, by a first relay agent over a TCP connection, a peer relationship with a second relay agent. The method may also include synchronizing, by the first relay agent, subscriber information with the second relay agent for a subscriber group. The method may then include periodically calculating, by the first relay agent, a checksum for all subscribers in the subscriber group. Additionally, the method may include exchanging, by the first relay agent, the checksum from the first relay agent with a second checksum from the second relay agent via periodic TCP keepalive messages. Furthermore, the method may include detecting, by the first relay agent, a mismatch between the checksums. Finally, the method may include resolving an inconsistency in subscriber information in response to detecting the checksum mismatch. Various other methods, systems, and computer-readable media are also disclosed.

20 Claims, 7 Drawing Sheets

Method
100

200

SYSTEMS AND METHODS FOR ENSURING REDUNDANCY BETWEEN RELAY AGENTS

BACKGROUND

In computing networks with relay agents, such as Dynamic Host Configuration Protocol (DHCP) networks, clients or subscribers often rely on relay agents to communicate with remote servers. For example, a DHCP peer, such as a DHCP relay agent, may receive and forward all data packets between a DHCP client device and a DHCP server. In addition, a single DHCP relay agent may act as a relay for multiple local clients or subscribers. Some relay agent systems may use subscriber redundancy to improve network resilience by protecting subscribers from a variety of software and hardware failures. For example, M:N subscriber redundancy is a scheme to allocate redundancy for M number of subscriber groups and N number of destinations or logical interfaces served by relay agents. For a pair of peer relay agents that redundantly serve a subscriber group, a failure in a relay agent may trigger a backup relay agent to take over.

However, in order to resume service without disruptions, subscriber information should remain consistent between peer DHCP relay agents or peer DHCP servers. In other words, subscribers should remain unaffected when a hardware or software failure occurs. Unfortunately, the subscriber state and binding information for the leases may become inconsistent between DHCP relay agents. These inconsistencies may be caused by network failures, system failures, configuration failures, or other types of failures. For example, packet drops or timing issues may disrupt the exchange of information between peer relay agents or servers. These inconsistencies may then cause errors when a redundant backup is needed. The instant disclosure, therefore, identifies and addresses a need for additional and improved systems and methods for ensuring consistency between redundant DHCP peers.

SUMMARY

As will be described in greater detail below, the instant disclosure describes various systems and methods for ensuring consistency between redundant DHCP peers by automating a periodic check during inactive periods to identify potential inconsistencies between relay agents. In one example, a computer-implemented method for ensuring consistency between redundant DHCP peers may include establishing, by a first relay agent over a Transmission Control Protocol (TCP) connection, a peer relationship with a second relay agent. The method may also include synchronizing, by the first relay agent, subscriber information with the second relay agent for a subscriber group. The method may then include periodically calculating, by the first relay agent, a checksum for all subscribers in the subscriber group. Additionally, the method may include exchanging, by the first relay agent, the checksum from the first relay agent with a second checksum from the second relay agent via periodic TCP keepalive messages. Furthermore, the method may include detecting, by the first relay agent, a mismatch between the checksums. Finally, the method may include resolving an inconsistency in subscriber information in response to detecting the checksum mismatch.

In addition, a corresponding system for ensuring consistency between redundant DHCP peers may include several modules stored in memory, including (i) an establishment module that establishes, by a first relay agent over a TCP connection, a peer relationship with a second relay agent, (ii) a synchronization module that synchronizes, by the first relay agent, subscriber information with the second relay agent for a subscriber group, (iii) a calculation module that periodically calculates, by the first relay agent, a checksum for all subscribers in the subscriber group, (iv) an exchange module that exchanges, by the first relay agent, the checksum from the first relay agent with a second checksum from the second relay agent via periodic TCP keepalive messages, (v) a detection module that detects, by the first relay agent, a mismatch between the checksums, and (vi) a resolution module that resolves an inconsistency in subscriber information in response to detecting the checksum mismatch. The system may also include one or more hardware processors that execute the establishment module, the synchronization module, the calculation module, the exchange module, the detection module, and the resolution module.

In some examples, the above-described method may be encoded as computer-readable instructions on a computer-readable medium. For example, a non-transitory computer-readable medium may include one or more computer-executable instructions that, when executed by one or more processors of a computing device, may cause the computing device to (i) establish, by a first relay agent over a Transmission Control Protocol (TCP) connection, a peer relationship with a second relay agent, (ii) synchronize, by the first relay agent, subscriber information with the second relay agent for a subscriber group, (iii) periodically calculate, by the first relay agent, a checksum for all subscribers in the subscriber group, (iv) exchange, by the first relay agent, the checksum from the first relay agent with a second checksum from the second relay agent via periodic TCP keepalive messages, (v) detect, by the first relay agent, a mismatch between the checksums, and (vi) resolve an inconsistency in subscriber information in response to detecting the checksum mismatch.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
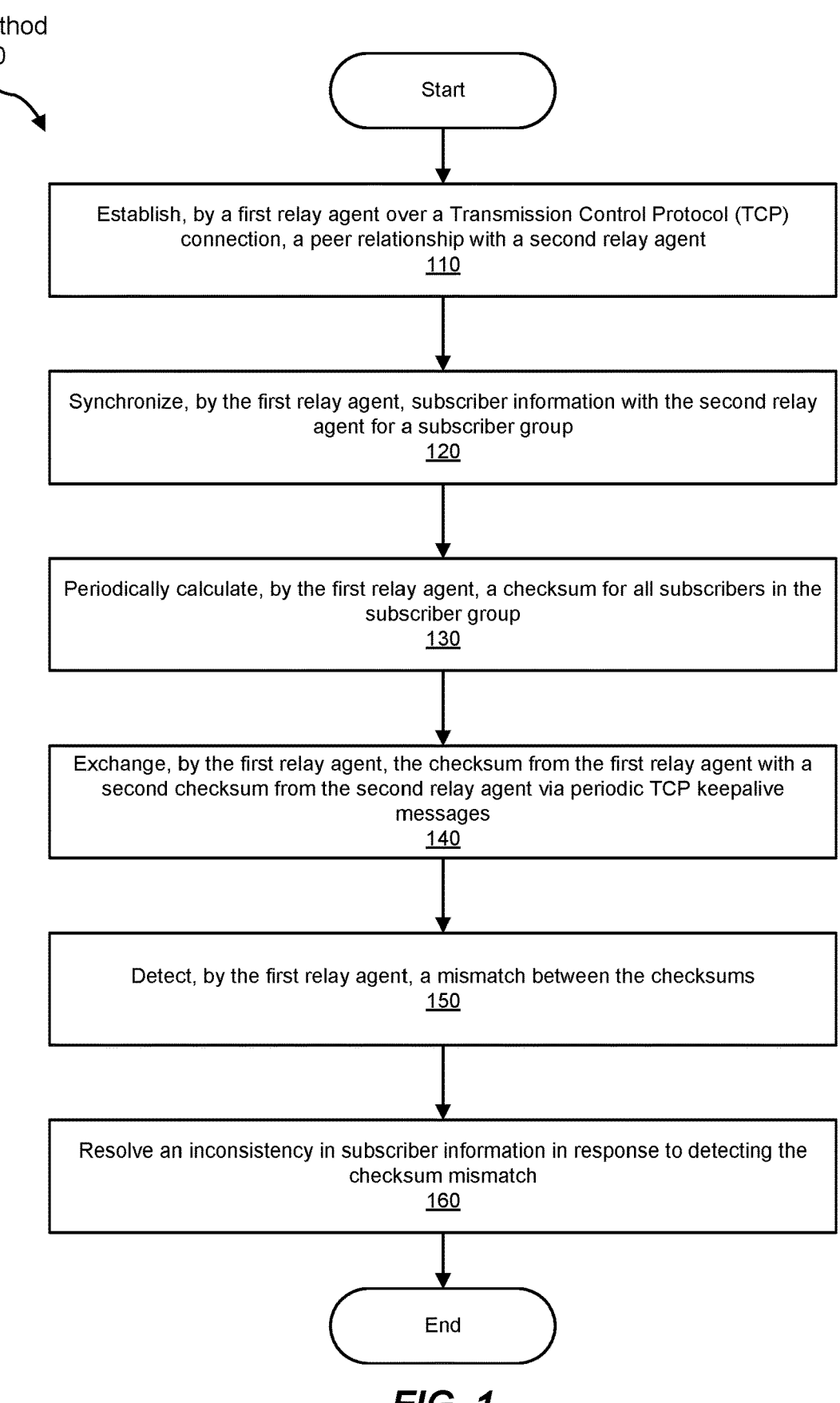
FIG. 1 is a flow diagram of an example method for ensuring consistency between redundant DHCP peers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for ensuring consistency between redundant Dynamic Host Configuration Protocol (DHCP) peers. As will be explained in greater detail below, embodiments of the instant disclosure may enable peer relay agents to automatically synchronize and resolve inconsistencies in subscriber information by exchanging periodic checksums. For example, by establishing a peer relationship over a Transmission Control Protocol (TCP) connection, two peer relay agents may serve a single subscriber group. By initially acquiring subscriber information for the subscriber group via bulk leasequery (BLQ) messages, the peer relay agents may ensure both relay agents have the same initial subscriber information. The systems and methods described herein may then send subsequent updates to subscriber information and bindings via active leasequery (ALQ) directly between the peer relay agents over the TCP connection.

Additionally, each peer relay agent may periodically generate a checksum for all subscribers over a logical interface (IFL). The disclosed systems and methods may also exchange the checksums over TCP keepalives between the peer relay agents. The disclosed systems and methods may automatically calculate and exchange the checksums at regular intervals during periods when the TCP connection is inactive and no ALQ updates are performed. If the checksums do not match for an IFL pair, the disclosed systems and methods may then determine there is an inconsistency between the peer relay agents. The systems and methods described herein may also initiate a BLQ message from both sides of the IFL pairing to query all subscribers over that IFL. In some examples, the systems and methods described herein may then resolve the inconsistency by updating subscriber information for one or both peer relay agents of the IFL pair. Furthermore, the disclosed systems and methods may generate separate checksums for each IFL pair and different subscriber groups.

In addition, the systems and methods described herein may improve the functioning of a computing device by automatically detecting and resolving inconsistencies in networks and, thereby, offering high-availability networks to end-user client devices. These systems and methods may also improve the fields of network resiliency and DHCP relays by ensuring subscribers on an interface are backed up on another interface of a peer node. Thus, the disclosed systems and methods may improve over typical methods of ensuring consistency between redundant DHCP peers.

The following will provide, with reference to FIG. 1, detailed descriptions of computer-implemented methods for ensuring consistency between redundant DHCP peers. Detailed descriptions of a corresponding example system will be provided in connection with FIG. 2. Detailed descriptions of an example system that includes example servers, example relay agents, and example subscriber groups will be provided in connection with FIG. 3. In addition, detailed descriptions of an example exchange of messages between example relay agents will be provided in connection with FIG. 4. Detailed descriptions of an example window of time causing an example error between example relay agents will also be provided in connection with FIG. 5. Furthermore, detailed descriptions of an example mechanism to avoid false positives in detecting example checksum mismatches will be provided in connection with FIG. 6. Finally, detailed descriptions of multiple example pairings of example peer relay agents will be provided in connection with FIG. 7.

FIG. 1 is a flow diagram of an exemplary computer-implemented method 100 for ensuring consistency between redundant DHCP peers. The steps shown in FIG. 1 may be performed by any suitable computer-executable code and/or computing system, including system 200 illustrated in FIG. 2. In one example, each of the steps shown in FIG. 1 may represent an algorithm whose structure includes and/or is represented by multiple sub-steps, examples of which will be provided in greater detail below.

Figure 2:
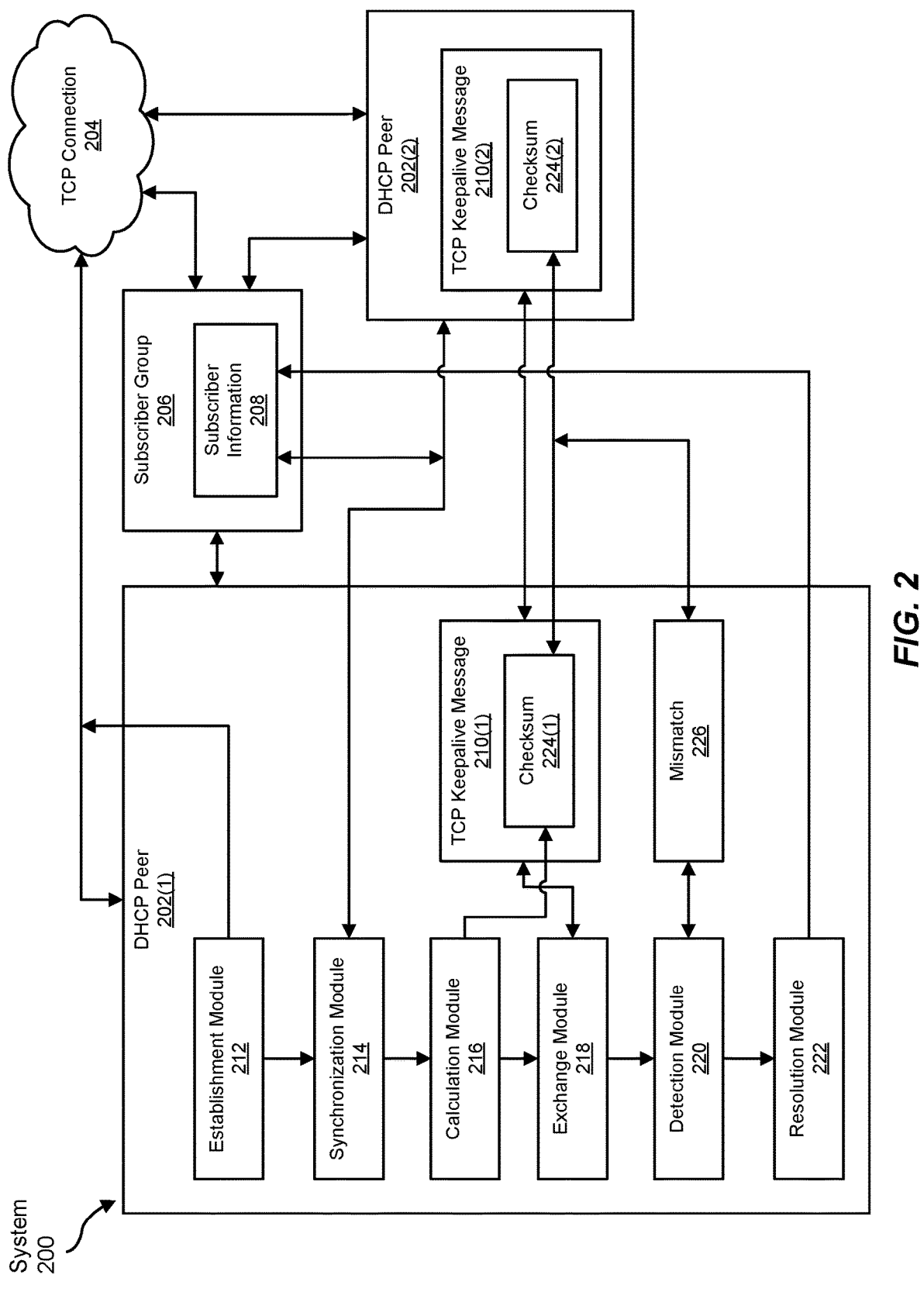
FIG. 2 is a block diagram of an example system for ensuring consistency between redundant DHCP peers.

As illustrated in FIG. 1, at step 110 one or more of the systems described herein may establish, by a first relay agent over a TCP connection, a peer relationship with a second relay agent. For example, FIG. 2 is a block diagram of an exemplary system 200 for ensuring consistency between redundant DHCP peers. As illustrated in FIG. 2, an establishment module 212 may, as part of a DHCP peer 202(1), establish a peer relationship with a DHCP peer 202(2) over a TCP connection 204.

The systems described herein may perform step 110 in a variety of ways. In one example, DHCP peers 202(1)-(2) may generally represent any type or form of computing device or server that may be programmed with the modules of FIG. 2 and/or may store all or a portion of the data described herein. For example, DHCP peers 202(1)-(2) may represent DHCP relay agents or DHCP servers that are capable of establishing a TCP connection to other relay agents or servers and that may be capable of reading computer-executable instructions. As another example, subscribers 306(1)-(8) of FIG. 3 may represent client devices that are capable of connecting to an access network 308, servers 302(1)-(2) may represent DHCP servers configured to provide network gateways and capabilities over a core network 304, and relay agents 310(1)-(2) may represent hosts that are capable of acting as intermediaries to receive data from and transmit data to subscribers 306(1)-(8) and servers 302(1)-(2).

Examples of DHCP relay agents, DHCP servers, and DHCP subscribers may include, without limitation, network devices, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, laptops, tablets, desktops, servers, cellular phones, personal digital assistants (PDAs), multimedia players, embedded systems, wearable devices, gaming consoles, portions of one or more of the same, variations or combinations of one or more of the same, and/or any other suitable computing devices. Additional examples of such devices include, without limitation, application servers and/or database servers configured to provide various database services and/or run certain software applications, such as media storage and streaming services.

Figure 3:
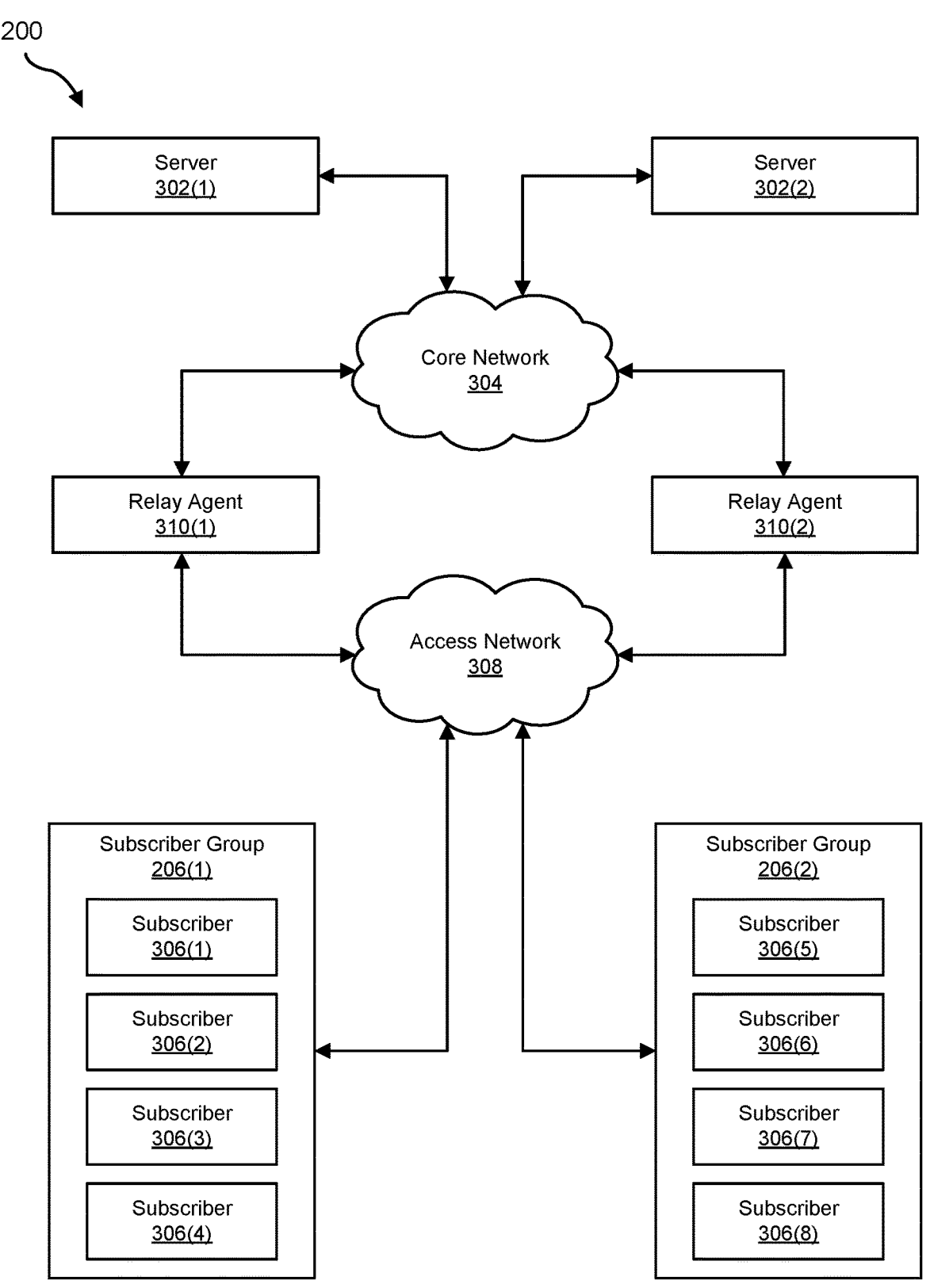
FIG. 3 is a block diagram of an example system that includes example servers, example relay agents, and example subscriber groups.

In some examples, relay agents 310(1)-(2), servers 302 (1)-(2), and/or subscribers 306(1)-(8) of FIG. 3 may be equipped with circuitry and/or hardware configured and/or programmed to perform one or more of the tasks and/or actions described herein. For example, such circuitry may include and/or represent one or more electrical and/or electronic circuits capable of processing, applying, modifying, transforming, transmitting, receiving, and/or executing instructions and/or data for relay agents 310(1)-(2), servers 302(1)-(2), and/or subscribers 306(1)-(8). In one example, such circuitry may access, read, write, and/or allocate memory in connection with ensuring consistency between redundant DHCP peers. Additionally or alternatively, such circuitry may receive, handle, process, and/or forward traffic (e.g., data and/or control packets) on relay agents 310(1)-(2), servers 302(1)-(2), and/or subscribers 306(1)-(8).

In some embodiments, relay agents 310(1)-(2), servers 302(1)-(2), and/or subscribers 306(1)-(8) may be in communication with each other or with other computing devices via TCP connection 204, core network 304, and/or access network 308. In such embodiments, TCP connection 204, core network 304, and/or access network 308 may include and/or represent any medium or architecture capable of facilitating communication or data transfer. In one example, TCP connection 204, core network 304, and/or access network 308 may include and/or represent wireless or wired connections. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

In some examples, the term "relay agent" may refer to routers or hosts that act as intermediaries to receive and forward data packets between client devices and servers. In these examples, the term "packet" may refer to a contained unit of data that is packaged to be easily transmittable. In some examples, the term "TCP connection" may refer to a network connection using a TCP communication standard. In some examples, the terms "peer relationship" or "peer-to-peer relationship" may refer to a network architecture that distributes workloads or resources between peer nodes.

In one embodiment, DHCP peer 202(1) may be a primary relay agent or server for a subscriber group 206, and DHCP peer 202(2) may be a backup relay agent or server for subscriber group 206. Alternatively, DHCP peer 202(2) may be the primary relay agent or server for subscriber group 206, and DHCP peer 202(1) may be the backup relay agent or server for subscriber group 206. In other examples, DHCP peer 202(1) may be a primary relay agent or server for one subscriber group, such as subscriber group 206(1) of FIG. 3, while simultaneously acting as a backup relay agent or server for a different subscriber group, such as subscriber group 206(2) of FIG. 3. Similarly, DHCP peer 202(2) may be a primary relay agent or server for subscriber group 206(2) of FIG. 3 while simultaneously acting as a backup relay agent or server for subscriber group 206(1). In other words, one or both of DHCP peers 202(1)-(2) may be active as a primary DHCP peer.

In some examples, the term "subscriber" may refer to a client node or device that utilizes a host to connect to network resources. In these examples, the term "subscriber group" may refer to a grouping of subscribers that share an interface. In these examples, the term "interface" may refer to a physical or logical component that connects a computing device to a network. For example, a logical interface may act as a bridge between DHCP subscribers and a DHCP network. In some examples, the terms "Dynamic Host Configuration Protocol" and "DHCP" may refer to a network management protocol that automatically assigns Internet Protocol (IP) addresses to enable a client-server architecture.

As illustrated in FIG. 3, relay agents 310(1) and 310(2) may act as intermediaries between subscriber groups 206 (1)-(2) of subscribers 306(1)-(8) and servers 302(1)-(2). For example, a primary router may host relay agent 310(2), and a backup router may host relay agent 310(1). In this example, the routers may include network routers such as a broadband network gateway (BNG). In some examples, the terms "broadband network gateway" and "BNG" may refer to routers or access points used by subscribers to connect to broadband networks. In the above example, a primary BNG may act as the primary router for subscriber group 206(1), and relay agent 310(2) may handle all network traffic for subscriber group 206(1). A backup BNG may serve as the backup router to subscriber group 206(1) and/or a primary router for subscriber group 206(2). If the primary router and/or relay agent 310(2) fails, then the backup router and relay agent 310(1) may become the new primary router to continue uninterrupted service to subscriber group 206(1). In other examples, the routers may include other types of network routers or devices that may host DHCP peers.

Returning to FIG. 1, at step 120, one or more of the systems described herein may synchronize, by the first relay agent, subscriber information with the second relay agent for a subscriber group. For example, a synchronization module 214 may, as part of DHCP peer 202(1) in FIG. 2, synchronize subscriber information 208 with DHCP peer 202(2) for subscriber group 206.

The systems described herein may perform step 120 in a variety of ways. In some examples, synchronization module 214 may synchronize subscriber information 208 by initiating a BLQ message to a DHCP peer, receiving subscriber information 208 for subscriber group 206, and storing subscriber information 208 at DHCP peer 202(1), wherein DHCP peer 202(2) also stores subscriber information 208. In some examples, the terms "bulk leasequery" and "BLQ" may refer to a protocol that enables a mechanism to obtain information on multiple bindings or leases in response to a query. In the above examples, the DHCP peer may represent DHCP peer 202(1) or DHCP peer 202(2) of FIG. 2, server 302(1) or server 302(2) of FIG. 3, relay agent 310(1) or relay agent 310(2), a local server connected to relay agents 310(1)-(2), and/or any other suitable DHCP server or DHCP relay agent. In these examples, subscriber information 208 may represent up-to-date information about all subscribers of subscriber group 206, and DHCP peer 202(2) may also initiate a BLQ message to obtain the same information. In other words, DHCP peers 202(1)-(2) may synchronize subscriber information 208 through BLQ messages. For example, the disclosed systems and methods may use a topology discovery mechanism to bind the subscriber states and all the information related to the clients or subscribers and then exchange the information between DHCP peers 202(1)-(2).

In some embodiments, subscriber information 208 may include, for each subscriber in subscriber group 206, one or more of a subscriber state, binding information for a subscriber, and/or lease information for the subscriber. In some examples, the term "binding information" may refer to information about a client or a subscriber and a corresponding website or server, such as the website's IP address, a port number, a host header, a site certificate, variations or combinations of one or more of the same, and/or any other suitable data that identifies the subscriber to the server or vice versa. In some examples, the term "lease information" may refer to information about a temporary assignment of an IP address to a client or a subscriber.

Figure 4:
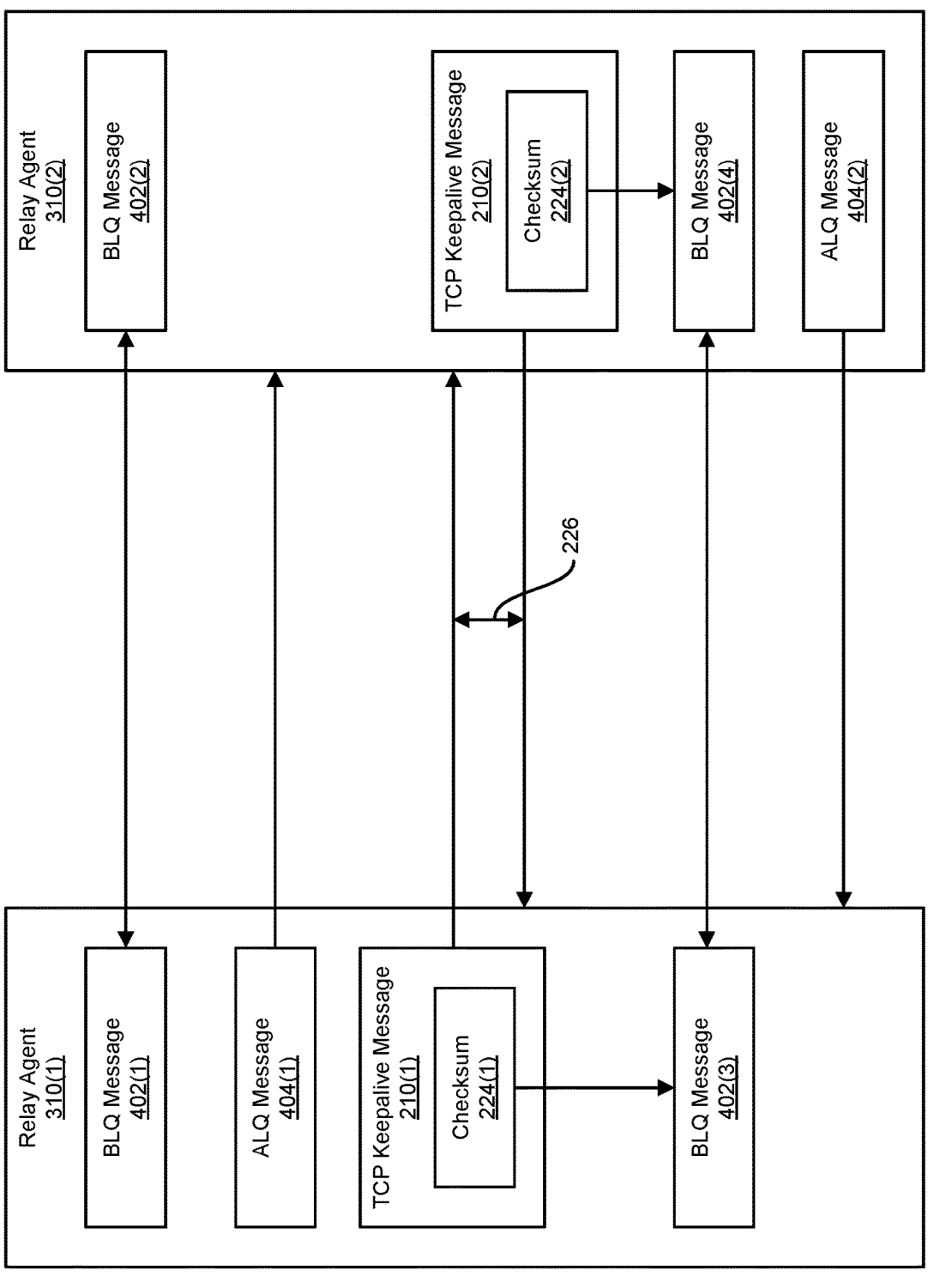
FIG. 4 is a block diagram of an example exchange of messages between example relay agents.

As illustrated in FIG. 4, relay agent 310(1) may initiate a BLQ message 402(1) to synchronize with relay agent 310(2), and relay agent 310(2) may similarly initiate a BLQ message 402(2). In this example, relay agents 310(1)-(2) may start with no information about any subscribers. Using BLQ messages 402(1)-(2), relay agents 310(1)-(2) may then establish a peer relationship as a primary relay agent and a backup relay agent for subscriber group 206 of FIG. 2. Although illustrated with relay agents 310(1)-(2) as examples of DHCP peers 202(1)-(2), FIG. 4 and subsequent figures and the disclosed embodiments may alternatively use DHCP servers, such as servers 302(1)-(2) of FIG. 3, or any other suitable DHCP peers in place of relay agents 310(1)-(2).

Returning to FIG. 1, at step 130, one or more of the systems described herein may periodically calculate, by the first relay agent, a checksum for all subscribers in the subscriber group. For example, a calculation module 216 may, as part of DHCP peer 202(1), calculate a checksum 224(1) for all subscribers in subscriber group 206.

The systems described herein may perform step 130 in a variety of ways. In some examples, the term "checksum" may refer to a calculated value representing a block of data used to verify data integrity. For example, a checksum of subscriber information may abstractly represent information about all subscribers within a subscriber group in a smaller format. In one embodiment, DHCP peer 202(1) may calculate checksum 224(1) for subscriber group 206 while DHCP peer 202(2) may independently calculate a checksum 224(2) for subscriber group 206. Using the same calculation process, checksum 224(1) and checksum 224(2) may represent the same value when DHCP peers 202(1)-(2) are correctly synchronized and/or are consistent.

Returning to FIG. 1, at step 140, one or more of the systems described herein may exchange, by the first relay agent, the checksum from the first relay agent with a second checksum from the second relay agent via periodic TCP keepalive messages. For example, an exchange module 218 may, as part of DHCP peer 202(1) in FIG. 2, exchange checksum 224(1) from DHCP peer 202(1) with checksum 224(2) from DHCP peer 202(2) via TCP keepalive messages 210(1)-(2).

The systems described herein may perform step 140 in a variety of ways. In some examples, the term "keepalive message" may refer to one or more data packets sent by a computing device to another computing device to determine or to ensure a connection between the two devices remains open. In one example, periodic TCP keepalive messages 210(1)-(2) may include messages sent between DHCP peer 202(1) and DHCP peer 202(2) at predetermined intervals to maintain TCP connection 204 during inactive periods. In other words, when there are no updates between DHCP peer 202(1) and DHCP peer 202(2), periodic TCP keepalive messages may keep TCP connection 204 active, with the predetermined intervals scheduled to preempt potential closing of TCP connection 204.

In some examples, checksums 224(1)-(2) may be calculated just prior to sending TCP keepalive messages 210(1)-(2). Additionally, checksums calculated during updates between DHCP peers 202(1)-(2) may result in false positive detection of errors. Therefore, in the above examples, checksums 224(1)-(2) may not be calculated during updates between DHCP peers 202(1)-(2). In other words, checksums 224(1)-(2) may not be calculated during updates due to keepalive messages only being sent during inactivity on TCP connection 204.

In some embodiments, the systems and methods disclosed herein may further include detecting, by DHCP peer 202(1) and/or a detection module, a change in subscriber information 208 for subscriber group 206. In these embodiments, the systems and methods disclosed herein may further include initiating an ALQ message, such as by an update module of DHCP peer 202(1), to DHCP peer 202(2) to update subscriber information 208 based on the change. In some examples, the terms "active leasequery" and "ALQ" may refer to a protocol that configures a mechanism to obtain live updates to information on multiple bindings or leases. For example, peer relay agents may be configured to provide live updates to each other using ALQ messages over TCP connection 204. In these embodiments, a change may represent a change to a subscriber lease or binding, an addition of a subscriber to subscriber group 206, and/or a removal of a subscriber from subscriber group 206.

In some embodiments, the systems and methods disclosed herein may further include receiving, by DHCP peer 202(1), the ALQ message from DHCP peer 202(2) based on the change in subscriber information 208 for subscriber group 206. In these embodiments, DHCP peer 202(1) may update subscriber information 208 stored by DHCP peer 202(1) based on the ALQ message. In these embodiments, ALQ messages may enable relay agents to install, remove, and/or update subscribers.

In the example of FIG. 4, relay agent 310(1) may detect a change to subscriber information 208 and may send an ALQ message 404(1) to relay agent 310(2), such that relay agent 310(2) updates its subscriber information. During a following inactive period, relay agent 310(1) may calculate checksum 224(1) and send it as part of TCP keepalive message 210(1) to relay agent 310(2). At the same time, relay agent 310(1) may calculate checksum 224(2) and sent it as part of TCP keepalive message 210(2) to relay agent 310(1). Due to relay agents 310(1)-(2) simultaneously calculating checksums 224(1)-(2), within a short time span, checksums 224(1)-(2) may represent the same value for subscriber information 208 when no errors are detected. In the example of FIG. 4, relay agent 310(2) may similarly detect a change to subscriber information 208 and may send an ALQ message 404(2) to relay agent 310(1) such that relay agent 310(1) updates its subscriber information.

Returning to FIG. 1, at step 150, one or more of the systems described herein may detect, by the first relay agent, a mismatch between the checksums. For example, a detection module 220 may, as part of DHCP peer 202(1) in FIG. 2, detect a mismatch 226 between checksum 224(1) and checksum 224(2).

The systems described herein may perform step 150 in a variety of ways. In some embodiments, DHCP peer 202(1) may receive checksum 224(2) from DHCP peer 202(2) as part of TCP keepalive message 210(2) and, subsequently, compare checksum 224(2) to checksum 224(1). In these embodiments, if checksum 224(1) and checksum 224(2) are equal, then detection module 220 may not detect mismatch 226. However, if checksum 224(1) and checksum 224(2) are not equal, detection module 220 may detect mismatch 226. In the example of FIG. 4, relay agent 310(1) may detect mismatch 226 between checksums 224(1)-(2).

Figure 5:
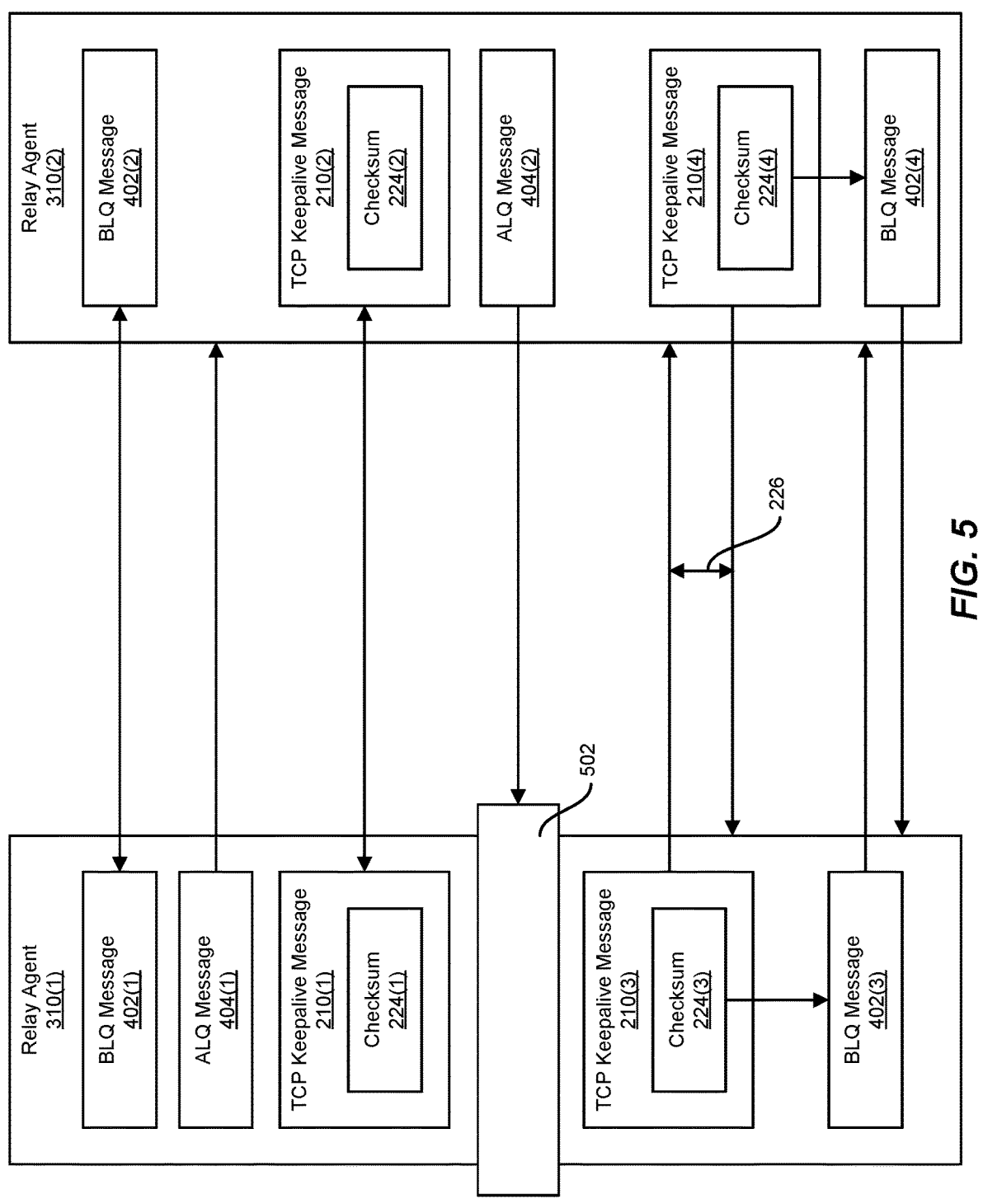
FIG. 5 is a block diagram of an example window of time causing an example error between example relay agents.

As illustrated in FIG. 5, relay agents 310(1)-(2) may calculate checksums 224(1)-(2) and send them as part of TCP keepalive messages 210(1)-(2). In this example, checksums 224(1)-(2) may be equal and may not require further action. In this example, relay agent 310(2) may then send ALQ message 404(2) to relay agent 310(1) to update subscriber information 208. However, in this example, relay agent 310(1) may include a window 502 during which a failure occurs or configurations are changed. For example, window 502 may represent a period of time during which relay agent 310(1) experiences a network connectivity issue. As another example, window 502 may represent time during which an administrator is performing a configuration update. In other examples, window 502 may represent a period during which a flexible Physical Interface Card (PIC) concentrator (FPC) is restarting, a Remote Authentication Dial-In User Service (RADIUS) is down, a configuration error occurs, and/or any other transient issue that results in an inconsistency in subscriber information. Thus, relay agent 310(1) may not receive ALQ message 404(2) or the subscriber information may not be updated even if relay agent 310(1) receives ALQ message 404(2), thereby resulting in relay agent 310(1) and relay agent 310(2) becoming out of sync. Subsequently, during another inactive period with no ALQ updates, relay agents 310(1)-(2) may calculate checksums 224(3)-(4) and send them as part of TCP keepalive messages 210(3)-(4). In this example, checksums 224(3)-(4) may not be equal due to relay agent 310(1) not receiving ALQ message 404(2), and relay agent 310(1) may detect mismatch 226 between checksums 224(3)-(4).

Returning to FIG. 1, at step 160, one or more of the systems described herein may resolve an inconsistency in subscriber information in response to detecting the checksum mismatch. For example, resolution module 222 may, as part of DHCP peer 202(1) in FIG. 2, resolve an inconsistency in subscriber information 208 in response to detecting mismatch 226.

The systems described herein may perform step 160 in a variety of ways. In one example, resolution module 222 may resolve the inconsistency by initiating a new BLQ message to query all subscribers in subscriber group 206, by receiving updated subscriber information for subscriber group 206, and by storing the updated subscriber information at DHCP peer 202(1), wherein DHCP peer 202(2) also stores the updated subscriber information. In this example, DHCP peer 202(1) may initiate the new BLQ message due to detecting mismatch 226.

In the example of FIG. 4, relay agents 310(1)-(2) may initiate BLQ messages 402(3)-(4) in response to detecting mismatch 226. Similarly, in the example of FIG. 5, relay agent 310(1) may detect mismatch 226 due to not receiving ALQ message 404(2) or failing to update in response to ALQ message 404(2), and relay agent 310(1) may then first initiate BLQ message 402(3) before relay agent 310(2) sends BLQ message 402(4). In other examples, if relay agent 310(2) detects mismatch 226, relay agent 310(2) may initiate BLQ message 402(4) before relay agent 310(1) sends BLQ message 402(3).

In some embodiments, the systems and methods disclosed herein may further include tracking, such as by a tracking module of DHCP peer 202(1), a number of consecutive checksum mismatches and delaying resolving the inconsistency in subscriber information 208 until the number of consecutive checksum mismatches meets a threshold. For example, as previously described, false positive inconsistencies may be detected due to the timing of various updates and checksum calculations. Thus, by setting a threshold number of consecutive checksum mismatches, the disclosed systems and methods may avoid unnecessarily performing updates with BLQ messages and avoid false positives during inconsistency detection.

Figure 6:
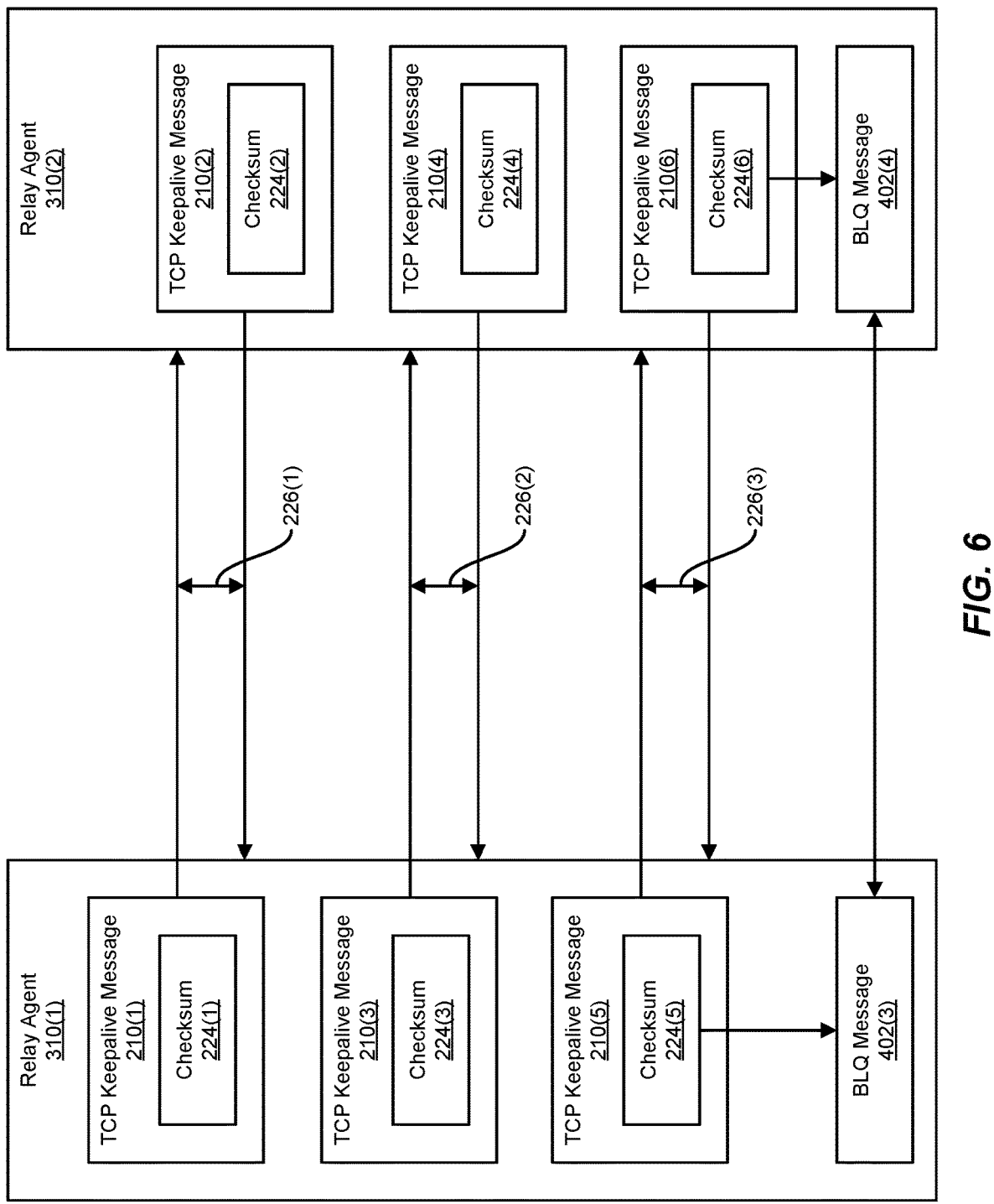
FIG. 6 is a block diagram of an example mechanism to avoid false positives in detecting example checksum mismatches.

As illustrated in FIG. 6, relay agent 310(1) may first detect a mismatch 226(1) between checksums 224(1)-(2). In this example, relay agent 310(1) may continue to wait for additional mismatches without initiating a BLQ message. In this example, relay agent 310(1) may then detect a second mismatch 226(2) between checksums 224(3)-(4). Subsequently, relay agent 310(1) may detect a third mismatch 226(3) between checksums 224(5)-(6) sent through TCP keepalive messages 210(5)-(6). In this example, the threshold number of consecutive checksum mismatches may be three. Thus, in the example of FIG. 6, relay agent 310(1) may initiate BLQ message 402(3) in response to detecting mismatch 226(3). In other examples, a user or an administrator may set the threshold to a different number of checksum mismatches.

In some embodiments, the systems and methods disclosed herein may further include identifying, based on the detected inconsistency, a failure in a primary router for a primary relay agent and, as a result, switching to a backup router for a backup relay agent. In the example of FIG. 5, window 502 may indicate a failure of relay agent 310(1). In this example, if the primary BNG hosts relay agent 310(1), the disclosed systems and methods may switch over to relay agent 310(2) hosted on the backup BNG. Additionally, when the failure of the primary router is resolved, the backup router may relinquish the primary role and the primary router may resume with the primary relay agent.

In some embodiments, the systems and methods disclosed herein may further include establishing, by DHCP peer 202(1) over TCP connection 204, an additional peer relationship with an additional DHCP peer for an additional subscriber group and synchronizing, by DHCP peer 202(1), additional subscriber information with the additional DHCP peer for the additional subscriber group. In these embodiments, DHCP peer 202(1) may periodically calculate an additional checksum for all subscribers in the additional subscriber group, exchange the additional checksum from DHCP peer 202(1) with an additional second checksum from the additional DHCP peer via additional periodic TCP keepalive messages, detect an additional mismatch between the additional checksums, and resolve an additional inconsistency in the additional subscriber information in response to detecting the additional checksum mismatch.

Figure 7:
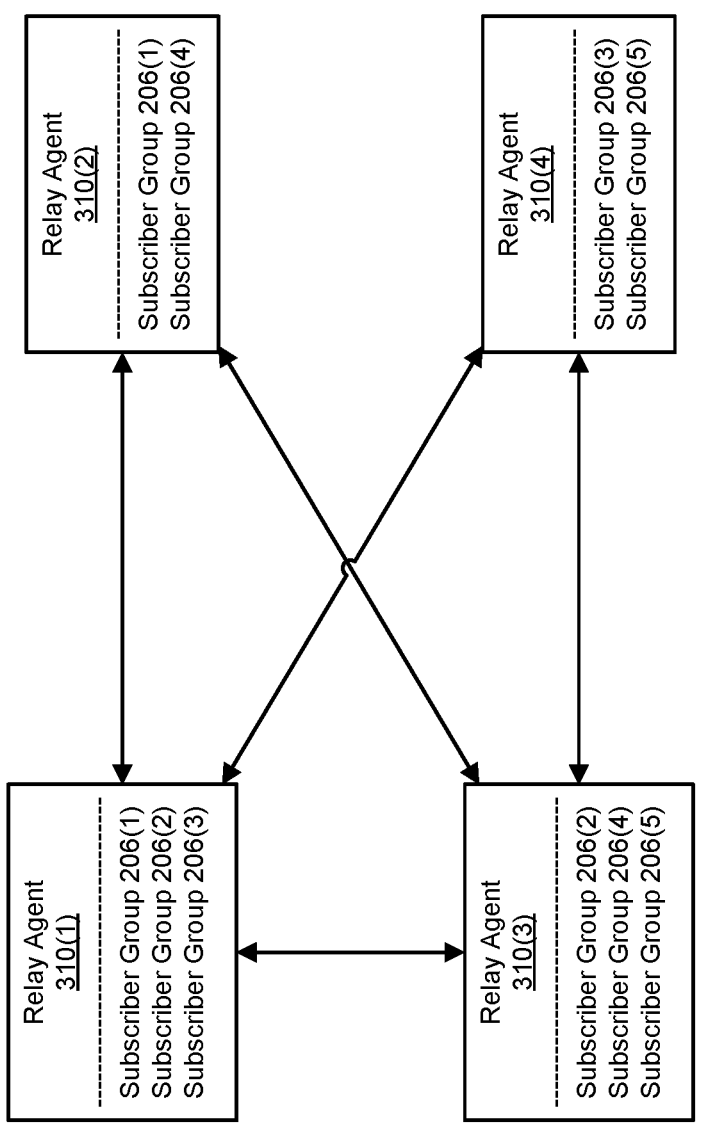
FIG. 7 is a block diagram of multiple example pairings of example peer relay agents.

As illustrated in FIG. 7, the disclosed systems and methods may include additional relay agents, such as relay agents 310(3)-(4). In this example, multiple subscriber groups 206(1)-(5) may be serviced by a combination of relay agents 310(1)-(4). For example, relay agent 310(1) and relay agent 310(2) may represent a pair that serves subscriber group 206(1). Similarly, relay agent 310(3) and relay agent 310(4) may represent a pair that serves subscriber group 206(5). In the example of FIG. 7, each pair of relay agents may establish a TCP connection, as represented by the arrows, and the modules of FIG. 2 may represent modules of any of relay agents 310(1)-(4).

In the above examples, checksums may be periodically generated for each pair of DHCP peers over an IFL, thereby creating M:N redundancy for M number of subscriber groups and N number of IFLs. In these examples, N number of checksums may be exchanged over TCP keepalives, with an IFL pairing being the key to map the checksums. In some embodiments, the disclosed systems and methods may further determine a cause of an inconsistency, such as by examining window 502 of FIG. 5. In these embodiments, the inconsistency may be due to network failures impacting the connection used to synchronize between DHCP peers, packet drops, timing issues, and/or other potential failures in one or both DHCP peers that result in inconsistencies. Although the disclosed embodiments generally describe relay agent redundancy, the disclosed systems and methods may also be extended to server redundancy, such as for DHCP servers. The disclosed M:N redundancy may also be applied to dynamic DHCPv4 and DHCPv6 subscribers on static 1:1 virtual local area networks (VLANs) over Internet Protocol over Ethernet (IPOE), VLAN-based static subscribers, and/or IP demultiplexer-based static subscribers for Virtual Router Redundancy Protocol (VRRP) redundancy. Additionally, the disclosed M:N redundancy may be applied to DHCPv4 and DHCPv6 subscribers on dynamic or static VLANs over IP or Multiprotocol Label Switching (MPLS) networks using DHCP for IP address management, which may ensure pseudowire redundancy. As used here, the term "pseudowire" may refer to an emulated point-to-point connection using a packet-switched network (PSN). Furthermore, other implementation details of the disclosed systems and methods may be adjusted by a user or an administrator to match a specific network architecture.

As explained above in connection with method 100 in FIG. 1, the disclosed systems and methods may, by automating the process of detecting discrepancies between DHCP peers, ensure the integrity of backup DHCP peers for subscriber groups in a network and the high availability of network resources. Specifically, the disclosed systems and methods may first synchronize two peer DHCP relay agents or two DHCP servers using BLQ messages. The peer relay agents or servers may then update subscriber information for the same subscriber group. The peer relay agents or servers may additionally detect changes in the subscriber group and update each other using ALQ messages. The disclosed systems and methods may also calculate checksums for each relay agent or server for the subscriber group during inactive periods when no ALQ updates are performed. A comparison of the checksums may subsequently reveal a mismatch that indicates an inconsistency in the subscriber information of the first relay agent or server and the subscriber information of the second relay agent or server. The systems and methods described herein may then initiate additional BLQ messages to update the subscriber information of both relay agents or servers to a current state. The disclosed systems and methods may also switch from a primary relay agent or server to a backup relay agent or server upon detection of a failure of the primary relay agent or server. Furthermore, the disclosed systems and methods may perform automated synchronization for multiple peer relay agent or server pairs and multiple subscriber groups.

By calculating and sending checksums with TCP keepalive message during inactive periods, the disclosed systems and methods may ensure potential inconsistencies due to losses of a relay agent or server are caught by its peer relay agent or server. Additionally, by updating subscriber information with the most current data after detecting an inconsistency, the disclosed systems and methods may automatically resolve the inconsistency without disrupting service to the subscriber group. Thus, the systems and methods described herein may improve the detection and resolution of network losses to enable leases and data traffic to continue without interruption.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs), Application-Specific Integrated Circuits (ASICs), Graphics Processing Units (GPUs), Systems on Chips (SoCs), portions of one or more of the same, variations or combinations of one or more of the same, or any other suitable physical processor.

Although illustrated as separate elements, the modules described and/or illustrated herein may represent portions of a single module or application or multiple modules or applications. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive subscriber information to be transformed, transform the subscriber information, output a result of the transformation to a DHCP peer, use the result of the transformation to calculate a checksum, and store the result of the transformation to identify a mismatch with another checksum. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
establishing, by a first relay agent over a Transmission Control Protocol (TCP) connection, a peer relationship with a second relay agent;
synchronizing, by the first relay agent, subscriber information with the second relay agent for a subscriber group;
periodically calculating, by the first relay agent, a checksum for all subscribers in the subscriber group, wherein the checksum is calculated during an inactive period of the TCP connection prior to a TCP keepalive message;
exchanging, by the first relay agent, the checksum from the first relay agent with a second checksum from the second relay agent via periodic TCP keepalive messages, wherein the second checksum is calculated during the inactive period of the TCP connection;
detecting, by the first relay agent, a mismatch between the checksums; and
resolving an inconsistency in subscriber information in response to detecting the checksum mismatch.

2. The method of claim 1, wherein:
at least one of the first relay agent or the second relay agent is a primary relay agent for the subscriber group; and
at least one of the first relay agent or the second relay agent is a backup relay agent for the subscriber group.

3. The method of claim 1, wherein synchronizing the subscriber information comprises:
initiating a bulk leasequery (BLQ) message to a Dynamic Host Configuration Protocol (DHCP) peer;
receiving the subscriber information for the subscriber group; and storing the subscriber information at the first relay agent, wherein the second relay agent also stores the subscriber information.

4. The method of claim 1, wherein the subscriber information comprises, for each subscriber in the subscriber group, at least one of:
a subscriber state;
binding information for a subscriber; and
lease information for the subscriber.

5. The method of claim 1, wherein the periodic TCP keepalive messages comprise messages sent between the first relay agent and the second relay agent at predetermined intervals to maintain the TCP connection during inactive periods.

6. The method of claim 1, wherein resolving the inconsistency comprises:
initiating a new BLQ message to query all subscribers in the subscriber group;
receiving updated subscriber information for the subscriber group; and
storing the updated subscriber information at the first relay agent, wherein the second relay agent also stores the updated subscriber information.

7. The method of claim 1, further comprising:
tracking a number of consecutive checksum mismatches; and
delaying resolving the inconsistency in subscriber information until the number of consecutive checksum mismatches meets a threshold.

8. The method of claim 1, further comprising:
detecting, by the first relay agent, a change in the subscriber information for the subscriber group; and
initiating an active leasequery (ALQ) message to the second relay agent to update the subscriber information based on the change.

9. The method of claim 8, further comprising:
receiving, by the first relay agent, the ALQ message from the second relay agent based on the change in the subscriber information for the subscriber group; and
updating the subscriber information stored by the first relay agent based on the ALQ message.

10. The method of claim 1, further comprising:
identifying, based on the inconsistency, a failure in a primary router for a primary relay agent; and
switching to a backup router for a backup relay agent.

11. The method of claim 1, further comprising:
establishing, by the first relay agent over the TCP connection, an additional peer relationship with an additional relay agent for an additional subscriber group;
synchronizing, by the first relay agent, additional subscriber information with the additional relay agent for the additional subscriber group;
periodically calculating, by the first relay agent, an additional checksum for all subscribers in the additional subscriber group;
exchanging, by the first relay agent, the additional checksum from the first relay agent with an additional second checksum from the additional relay agent via additional periodic TCP keepalive messages;
detecting, by the first relay agent, an additional mismatch between the additional checksums; and
resolving an additional inconsistency in the additional subscriber information in response to detecting the additional checksum mismatch.

15

16

12. A system comprising:

an establishment module, stored in memory, that establishes, by a first relay agent over a Transmission Control Protocol (TCP) connection, a peer relationship with a second relay agent;

a synchronization module, stored in memory, that synchronizes, by the first relay agent, subscriber information with the second relay agent for a subscriber group;

a calculation module, stored in memory, that periodically calculates, by the first relay agent, a checksum for all subscribers in the subscriber group, wherein the checksum is calculated during an inactive period of the TCP connection prior to a TCP keepalive message;

an exchange module, stored in memory, that exchanges, by the first relay agent, the checksum from the first relay agent with a second checksum from the second relay agent via periodic TCP keepalive messages, wherein the second checksum is calculated during the inactive period of the TCP connection;

a detection module, stored in memory, that detects, by the first relay agent, a mismatch between the checksums;

a resolution module, stored in memory, that resolves an inconsistency in subscriber information in response to detecting the checksum mismatch; and at least one processor that executes the establishment module, the synchronization module, the calculation module, the exchange module, the detection module, and the resolution module.

13. The system of claim 12, wherein:

at least one of the first relay agent or the second relay agent is a primary relay agent for the subscriber group; and at least one of the first relay agent or the second relay agent is a backup relay agent for the subscriber group.

14. The system of claim 12, wherein the synchronization module synchronizes the subscriber information by:

initiating a bulk leasequery (BLQ) message to a Dynamic Host Configuration Protocol (DHCP) peer;

receiving the subscriber information for the subscriber group; and storing the subscriber information at the first relay agent, wherein the second relay agent also stores the subscriber information.

15. The system of claim 12, wherein the subscriber information comprises, for each subscriber in the subscriber group, at least one of:

a subscriber state;

binding information for a subscriber; and lease information for the subscriber.

16. The system of claim 12, wherein the periodic TCP keepalive messages comprise messages sent between the first relay agent and the second relay agent at predetermined intervals to maintain the TCP connection during inactive periods.

17. The system of claim 12, wherein the resolution module resolves the inconsistency by:

initiating a new BLQ message to query all subscribers in the subscriber group;

receiving updated subscriber information for the subscriber group; and storing the updated subscriber information at the first relay agent, wherein the second relay agent also stores the updated subscriber information.

18. The system of claim 12, further comprising:

a tracking module that tracks a number of consecutive checksum mismatches; and the resolution module that delays resolving the inconsistency in subscriber information until the number of consecutive checksum mismatches meets a threshold.

19. The system of claim 12, further comprising:

the detection module that detects, by the first relay agent, a change in the subscriber information for the subscriber group; and an update module that initiates an active leasequery (ALQ) message to the second relay agent to update the subscriber information based on the change.

20. A non-transitory computer-readable medium comprising one or more computer-executable instructions that, when executed by at least one processor of a computing device, cause the computing device to:

establish, by a first relay agent over a Transmission Control Protocol (TCP) connection, a peer relationship with a second relay agent;

synchronize, by the first relay agent, subscriber information with the second relay agent for a subscriber group;

periodically calculate, by the first relay agent, a checksum for all subscribers in the subscriber group, wherein the checksum is calculated during an inactive period of the TCP connection prior to a TCP keepalive message;

exchange, by the first relay agent, the checksum from the first relay agent with a second checksum from the second relay agent via periodic TCP keepalive messages, wherein the second checksum is calculated during the inactive period of the TCP connection;

detect, by the first relay agent, a mismatch between the checksums; and resolve an inconsistency in subscriber information in response to detecting the checksum mismatch.

* * * * *